United States Patent [19]

Zorzi et al.

[11] 4,145,330

[45] Mar. 20, 1979

[54] FLAME RETARDANT POLYPIVALOLACTONE COMPOSITIONS

[75] Inventors: Paul A. Zorzi; Thomas S. Allen; Michael E. Kucsma, all of Baton Rouge, La.

[73] Assignee: Ethyl Corporation, Richmond, Va.

[21] Appl. No.: 851,051

[22] Filed: Nov. 14, 1977

[51] Int. Cl.$^2$ .......................... C08K 3/32; C08K 7/14
[52] U.S. Cl. ............................ 260/37 R; 260/45.9 NP
[58] Field of Search ................. 260/45.9 NP, 78.3 R, 260/37 R

[56] References Cited

U.S. PATENT DOCUMENTS

| 3,268,486 | 8/1966 | Klootwijk ...................... 260/78.3 R |
| 3,397,035 | 8/1968 | Shen et al. ............... 260/45.9 NP X |
| 3,669,940 | 6/1972 | Desgurse et al. ............... 260/78.3 R |
| 3,738,959 | 6/1973 | Savides et al. ........... 260/45.9 NP X |

*Primary Examiner*—Sandra M. Person
*Attorney, Agent, or Firm*—Donald L. Johnson; John F. Sieberth; Frederick A. Stolzle, Jr.

[57] ABSTRACT

Flame retardant thermoplastic compositions containing polypivalolactone resin, an inorganic phosphate, and optionally a fiberglass filler and a polybrominated aromatic compound.

11 Claims, No Drawings

FLAME RETARDANT POLYPIVALOLACTONE COMPOSITIONS

BACKGROUND

This invention relates to polypivalolactone resin compositions resistant to burning. More particularly, this invention relates to the use in polypivalolactone resins of particular flame retardants which render the resin compositions resistant to burning without causing substantial deterioration in their physical properties.

Polypivalolactone is a well known thermoplastic material. Methods for its synthesis are described for example in U.S. Pat. Nos. 3,268,486, 3,471,456, 3,669,940 and 3,773,726, which patents are incorporated herein by reference. Applications for polypivalolactone include its use in making films (e.g., U.S. Pat. No. 3,476,714) and synthetic fiber (e.g., U.S. Pat. No. 3,299,171). Mayne, in an article entitled "The Polymerization of Pivalolactone" published in *Chemtech* (December, 1972), points out the usefulness of polypivalolactone as an engineering thermoplastic because of its high heat resistance.

One drawback of polypivalolactone and most polypivalolactone compositions, whether filled or unfilled, is their amenability to burning. For applications such as those mentioned above it is desirable that the polymer be rendered resistant to burning. Preferably it should be rendered self-extinguishing, i.e., it should have an Underwriters Laboratory (UL) rating of at least 94VE-2.

Finding effective flame retardants for particular polymers has proved to be no simple task. The flame retardant-polymer composition must not only resist burning as measured according to a specifically outlined procedure, but it should also not sustain any substantial depreciation in its important physical properties, such as tensile strength, impact strength, and color.

THE INVENTION

In accordance with this invention, flame retarded polypivalolactone compositions are provided in which there is no significant impairment of physical properties, such as tensile strength, impact strength and color. More particularly, this invention provides thermoplastic compositions which comprise polypivalolactone resin containing an inorganic ammonium polyphosphate in an amount up to about 45 phr sufficient to render the composition flame resistant. If desired, the compositions of this invention may contain suitable quantities of various other ingredients, such as for example reinforcing fillers, plasticizers, antioxidants, thermal stabilizers, mold lubricants, auxiliary flame retardants and synergists, flow improvers, impact modifiers, and various other similar components.

Among the preferred compositions of this invention are those wherein the thermoplastic polypivalolactone resin has a limiting viscosity number in the range of from about 0.8 to about 2.5, wherein the composition contains a reinforcing amount of glass fiber reinforcing agent, and wherein the amount of the ammonium polyphosphate is up to about 30 phr. Desirable compositions additionally contain from about 1 phr to about 20 phr of a polybrominated aromatic compound.

For use in molding operations, the polypivalolactone will normally have a limiting viscosity number of from about 0.8 to about 3.0, a range of from about 1.5 to about 2.5 being preferred. As is well known in the art—see Billmeyer, *Textbook of Polymer Science*, Interscience, New York, 1965, pp. 79–81—LVN is a measure of polymer molecular weight. It will be understood that the polypivalolactone may be used as essentially the sole resinous ingredient of the composition or it may be used in the form of blends with other thermoplastics.

Ammonium polyphosphate flame retardants are known polymeric compounds discussion of which may be found in Kuryla and Papa, *Flame Retardancy of Polymeric Materials*, Vol. I (Marcel Denker, Inc., 1973), pp. 140–145. The structure of ammonium polyphosphate is

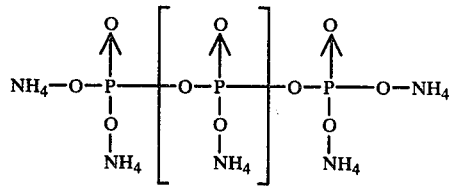

where n is greater than 50 and may run as high as 20,000. These compounds usually contain about 32% by weight of phosphorus and are known to have flame retardant properties when utilized with wood [H. W. Eickner and E. L. Schaffer, *Fire Technol.*, 3, 90 (1967)] and with rigid polyurethane foams [C. E. Miles and J. W. Lyons, *J. Cell. Plastics*, 3, 539)1967].

The amount of ammonium polyphosphate used in the compositions of the present invention may be varied and normally will involve consideration of such factors as whether or not other flame retardants are incorporated into the composition, whether or not a reinforcing filler is used, and the degree of flame resistancy desired. Usually, the amount used will fall in the range of from about 8 phr to about 45 phr. In compositions filled for example with 40–50 phr of fiberglass filler, a preferred range of proportions for the ammonium polyphosphate is between about 10 and 25 phr. In unfilled compositions a range of from about 25 phr to about 35 phr of ammonium polyphosphate generally yields a desirable, cost-efficient flame resistant material.

The manner of incorporating the ammonium polyphosphate into the polypivalolactone resin may be any of the conventional procedures known for adding finely particulated inorganic compounds to polymers such as Henschel mixing, roll milling, Banbury mixing, extrusion and the like.

Reinforcing fillers may also be incorporated into the flame resistant composition in order to enhance certain properties of the thermoplastic material. These reinforcing fillers may be used for example to obtain the degree of strength and resistance to deformation at elevated temperatures necessary for the more demanding engineering thermoplastic applications. Fillers which may be used include the so-called fiber fillers (e.g., fiberglass) and the so-called particulate fillers (e.g., alumina, silica, mullite and graphite).

The amount of reinforcing filler incorporated in the flame resistant composition is largely dependent upon the characteristics desired in the composition. Generally, the amount of reinforcing filler will range from about 10 phr to about 60 phr based on the weight of the polypivalolactone resin. Preferably, the reinforcing filler ranges from about 30 phr to about 50 phr, based on the weight of the polypivalolactone resin.

In addition to ammonium polyphosphate, other flame retardant materials may be incorporated into the compositions of the present invention. The incorporation of certain polybrominated aromatic compounds into these compositions is particularly desirable. Although a variety of compounds may be employed, polybrominated compounds are preferred. Exemplary materials include pentabromotoluene; tetrabromophthalic anhydride; tetrabromophthalic acid; 3,5,3',5'-tetrabromobiphenyl ether; 2,2',4,4',6,6'-hexabromobiphenyl; 2,2-bis(3,3',5,5'-tetrabromo-4,4'-dihydroxyphenyl)propane; and bis(pentabromophenoxy)butane. Preferred polybrominated aromatics are those of the formulas:

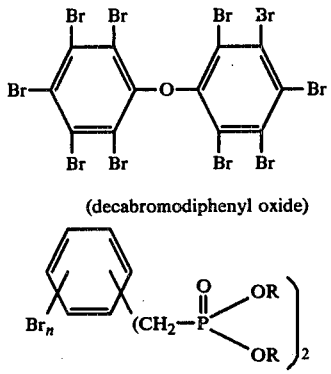

(decabromodiphenyl oxide)

wherein n is 2-4, most preferably 4, and each R is alike or different and selected from lower hydrocarbyl groups and halo-substituted lower hydrocarbyl groups. An exemplary compound of the latter formula is bis(dimethoxyphosphinyl)tetrabromo-p-xylene.

The amount of polybrominated aromatic flame retardant may range from about 1 phr to about 20 phr depending on the amount of ammonium polyphosphate flame retardant utilized. More preferably, the range of the amount of polybrominated aromatic flame retardant is from about 1 phr to about 10 phr.

Another facet of this invention involves the use of certain metal compounds to enhance the effectiveness of the flame retardant(s) employed in the plastic compositions. Such metal compounds include inorganic salts and oxides of antimony, arsenic, bismuth, molybdenum, tin, tungsten, zinc, etc. Illustrative examples of these enhancing agents include $Sb_2O_3$, $SbCl_3$, $SbOCl$, $SbCl_5$, $NaSbO_3$, $As_2O_3$, $As_2O_5$, $Bi_2O_3$, $MoO_3$, $SnO_2$, $WO_3$, $Zn(BO_2)_2$, $Zn_3(BO_3)_2$, and the like. A preferred material of this type is antimony trioxide.

The above enhancing agents or synergists are employed in amounts sufficient to enhance the effectiveness of the ammonium polyphosphate or of the combinations of the ammonium polyphosphate and polybrominated aromatic compounds used in the polypivalolactone compositions of the invention. In general, the amount employed is from about 1 phr to about 30 phr, preferably from about 5 phr to about 15 phr.

Compositions of the present invention may also contain a non-dripping additive in order to reduce dripping of polymer compositions when exposed to elevated temperatures. Among the desirable non-dripping additives are titanium dioxide, calcium carbonate, calcium hydroxide, mica, asbestos, fiberglass, and fumed silica. The amount of non-dripping additive may vary widely but will generally fall between about 1 phr and about 30 phr with the range of from about 5 phr to about 15 phr being particularly preferred.

Although not essential, it is preferred to use a nucleating agent in the compositions of the present invention to provide maximum toughness. A variety of materials known to be effective as nucleating agents for other crystalline polymers can be used, such as metal salts of aromatic or alicyclic carboxylic or sulfonic acids (e.g., lithium benzoate, sodium α-naphthalene sulfonate, sodium cyclohexane carboxylate); salts of aliphatic mono or dibasic carboxylic or sulfonic acids (e.g., sodium caproate, sodium succinate); salts of arylalkyl carboxylic or sulfonic acids (e.g., aluminum phenylacetate); or particulate inorganic materials (e.g., clays, silica, titanium dioxide, and the like).

The amount of nucleating agent can range from about 0.01 to about 10 phr. More preferably the nucleating agent ranges from about 0.05 phr to about 2 phr.

As noted above, still other ingredients may be incorporated into the polypivalolactone formulations of this invention. Thus for example an antioxidant, the function of which is to prevent normal oxidation, may be incorporated into the flame resistant compositions. Examples of suitable antioxidants are 1,3,5-trimethyl-2,4,6-tris(3,5-di-tert-butyl-4-hydroxybenzyl)benzene and N-phenyl-β-napthylamine. Other desirable ingredients include a coupling agent to enhance the attraction between the filler and the pivalolactone polymer, and a pigmenting material (e.g., titanium dioxide) to color the polymer composition. Other illustrative ingredients include lubricants, other resins, light stabilizers, plasticizers, impact modifiers, etc. These various ingredients or additives may be incorporated into the resin compositions of this invention by intimately blending by either dry blending or melt blending, blending in extruders, heated rolls or other types of mixtures.

The following examples will serve to illustrate the invention. In Examples 1 through 22, shown in Tables I and II, blends were prepared in a Prodex-Henschel mixer and compounded either by extruding rods or by molding parts on a New Britain injection molder. The rods or parts were granulated, re-fed into the injection molder and molded into test specimens. Processing conditions are listed below:

Mixer: Prodex-Henschel, Model 2J ss
Mixing Time: 3 minutes or until temperature reached 150° F.
Mixing Speed: 1800 RPM
Molder: New Britain, Type 175
Screw Type: General purpose
Compression Ratio: 2/1
Nozzle Size: 0.180 inches
Shot Size: 1.2 inches
Temperature Profile: 430° F., 480° F., 480° F., 80% (Nozzle)
Injection Speed: Maximum
Injection Pressure: 600 psig
Back Pressure: 200 psig
Holding Time: 5 seconds
Cooling Time: 35 seconds
Mold Temperature: 165° F.

The test specimens so prepared were subjected to various standard test procedures in order to determine their flammability and physical or mechanical properties. Flammability testing involved subjecting as is well known, compression molded plaques to the UL-94 Vertical Burn Test. This is a specifically outlined method established by Underwriters' Laboratories whereby the flammability of a material may be established. The flammability characteristics of the material are determined in relation to specified test criteria and a rating applied.

The highest rating is 94VE-0. For a material to be classified 94VE-0 it must meet three criteria. Of five specimens of the material tested, (1) none shall burn with flaming combustion for more than ten seconds after each application of the test flame, (2) the five specimens shall not have a total flaming combustion time exceeding 50 seconds, and (3) none of the specimens shall burn with flaming or glowing combustion up to the holding lamp. Materials that resist burning but do not meet the standards required by the VE-0 flame test may be classified VE-1 or VE-2 depending on their burn times, VE-2 being the lowest rating. The term "flame resistant" is intended to include compositions with a VE-0, VE-1, or a VE-2 rating. The procedure for testing the specimens is outlined in Underwriters' Laboratories "The Standard for Tests for Flammability of Plastic Materials for Parts in Devices and Appliances", subject 94, September 1973, pp. 6–10, which is incorporated herein by reference.

Physical and mechanical properties in the Examples summarized in Table I were determined in accordance with ASTM procedures where applicable: tensile strength—D-638; tensile elastic modulus—D-638; flexural strength—D-790; flexural elastic modulus—D-790; Izod impact—D-256; heat distortion temperature—D-648; tensile impact—D-1822. The spiral flow values were obtained by extruding the compositions at about 480° F. into a coiled spiral mold 25 inches from head to tail which is kept at about 165° F. The penetration in inches of the hot polymer composition into the cooler mold is termed the "spiral flow". Examples 4 through 22 summarized in Table II involved only flame retardancy testing.

TABLE I
Flame Resistance of Polypivalolactone Formulations

|  | Control | Ex. 1 | 2 | 3 |
|---|---|---|---|---|
| FORMULATION (PHR) | | | | |
| Polypivalolactone[1] | 100 | 100 | 100 | 100 |
| Fiberglass[2] | 43 | 43 | 43 | 43 |
| Coupling Agent[3] | 0.5 | 0.5 | 0.5 | 0.5 |
| Antioxidant[4] | 0.1 | 0.1 | 0.1 | 0.1 |
| Nucleating Agent[5] | 0.5 | 0.5 | 0.5 | 0.5 |
| Ammonium polyphosphate[6] | — | 18 | 10 | 10 |
| Decabromodiphenyl oxide | — | — | 4 | — |
| BDPTX[7] | — | — | — | 5 |
| PROPERTIES | | | | |
| UL94 Rating | None[8] | VE-O | VE-O | VE-O |
| Specific Gravity | 1.337 | 1.427 | 1.436 | 1.435 |
| Tensile Strength (psi) | 8460 | 8320 | 7630 | 7450 |
| Elongation (%) | 1.30 | 1.33 | 0.97 | 1.10 |
| Tensile Modulus ($\times 10^3$), (psi) | 1020 | 1060 | 1140 | 1130 |
| Flexural Strength (psi) | 15,200 | 15,000 | 15,000 | 13,400 |
| Flexural Modulus ($\times 10^3$), (psi) | 946 | 988 | 1000 | 946 |
| Izod Impact - ¼" (ft - lb/in) | 1.1 | 1.0 | 1.0 | 1.0 |
| Izod Impact - ⅛" (ft - lb/in) | 1.2 | 1.0 | 1.0 | 1.0 |
| Tensile Impact (ft - lb/in²) | 13.1 | 13.7 | 11.8 | 9.5 |
| Deflection Temp. at 264 psi (° C.) | 221 | 213 | 213.5 | 187 |
| Deflection Temp. at 66 psi (° C.) | 240 | 229 | 228 | 226.5 |
| Color | White | Off White | Off White | Off White |
| Spiral Flow (inches) | 11.5 | 15.5 | 15.5 | 15.5 |

[1]LVN 2.1; Measured in benzyl alcohol at 150° C.; Stabilized with 0.05 weight percent dicetyl sulfide.
[2]Owens Corning Fiberglass: Grade 2219-641-3 (¼- strands).
[3]A-187, glycidoxypropyltrimethoxysilane; Union Carbide Corporation.
[4]1,3,5-Trimethyl-2,4,6-tris(3,5-di-tert-butyl-4-hydroxybenzyl)benzene; Ethyl Corporation.
[5]TiO$_2$.
[6]Phos-Chek ®P/30; Monsanto Company (a flame retardant containing about 32% phosphorus).
[7]Bis(dimethoxyphosphinyl)tetrabromo-p-xylene.
[8]"None" indicates that the composition did not meet the flammability standards required to merit a VE-0, VE-1, or a VE-2 rating.

TABLE II
FLAME RESISTANCE OF POLYPIVALOLACTONE FORMULATIONS

| FORMULATIONS (PHR) | Ex. 4 | 5 | 6 | 7 | 8 | 9 | 10 | 11 |
|---|---|---|---|---|---|---|---|---|
| Polypivalolactone[1] | 100 | 100 | 100 | 100 | 100 | 100 | 100 | 100 |
| Fiberglass[2] | 43 | 43 | 43 | 43 | 43 | 43 | 43 | 43 |
| Coupling Agent[3] | 0.5 | 0.5 | 0.5 | 0.5 | 0.5 | 0.5 | 0.5 | 0.5 |
| Antioxidant[4] | 0.1 | 0.1 | 0.1 | 0.1 | 0.1 | 0.1 | 0.1 | 0.1 |
| Nucleating Agent[5] | 0.5 | 0.5 | 0.5 | 0.5 | 0.5 | 0.5 | 0.5 | 0.5 |
| Ammonium Polyphosphate[6] | 10 | 15 | 10 | 10 | 15 | 10 | 10 | 10 |
| Decabromodiphenyl oxide | 10 | 5 | 5 | 2 | — | 5 | — | 4 |
| Other | — | — | — | — | 5[7] | — | 5[9] | — |
| UL94 Rating | VE-0 | VE-0 | VE-0 | VE-1 | VE-0[8] | VE-0 | VE-0 | VE-0 |

[1] - [6]See Footnotes [1] - [6] under Table I.
[7]Tetrabrometa-xylene
[8]Volatiles observed.
[9]Bis(dimethoxyphosphinyl)tetrabromo-p-xylene.

| FORMULATIONS (PHR) | Ex. 12 | 13 | 14 | 15 | 16 | 17 | 18 | 19 |
|---|---|---|---|---|---|---|---|---|
| Polypivalolactone[1] | 100 | 100 | 100 | 100 | 100 | 100 | 100 | 100 |
| Fiberglass[2] | 43 | 43 | 43 | 43 | 43 | 43 | 43 | 43 |
| Coupling Agent[3] | 0.5 | 0.5 | 0.5 | 0.5 | 0.5 | 0.5 | 0.5 | 0.5 |
| Antioxidant[4] | 0.1 | 0.1 | 0.1 | 0.1 | 0.1 | 0.1 | 0.1 | 0.1 |
| Nucleating Agent[5] | 0.5 | 0.5 | 0.5 | 0.5 | 0.5 | 0.5 | 0.5 | 0.5 |
| Ammonium Polyphosphate[6] | 10 | 13 | 11 | 11 | 11 | 18 | 10 | 10 |
| Decabromodiphenyl oxide | — | 2.5 | 3 | 3 | 3 | — | 4 | — |
| Other | 4[9] | — | 2[10] | 2[11] | 2[12] | — | — | 6[13] |
| UL94 Rating | VE-1 | VE-1 | VE-1 | VE-1 | VE-1 | VE-0 | VE-0 | VE-0 |

[10]Antimony oxide (Sb$_2$O$_3$).
[11]Zinc borate.
[12]Alumina hydrate.
[13]Octabromo-4,4'-dimethyldiphenylether.

| FORMULATIONS (PHR) | Ex. 20 | 21 | 22 |
|---|---|---|---|
| Polypivalolactone[1] | 100 | 100 | 100 |
| Fiberglass[2] | 43 | — | — |
| Coupling Agent[3] | — | — | — |
| Antioxidant[4] | 0.1 | 0.1 | 0.1 |
| Nucleating Agent[5] | 0.5 | 0.5 | 0.5 |
| Ammonium Polyphosphate[6] | 18 | 18 | 30 |
| Decabromodiphenyl oxide | — | — | — |
| Other | — | — | — |

TABLE II-continued
FLAME RESISTANCE OF POLYPIVALOLACTONE FORMULATIONS

| UL94 Rating | VE-0 | None[14] | VE-0 |
|---|---|---|---|

[14] See Footnote 8 under Table I.

Tables I and II contain formulations which exemplify the present invention. Examples 1, 2 and 3 are formulations of particularly desirable compositions and their properties. Table II contains other formulations which are illustrative of the practice of the present invention.

Table III shows the relative effectiveness of certain non-dripping additives when used in unreinforced polypivalolactone. The test was run in accordance with the UL-94 Vertical Burn Test described above. A value corresponding to the number of seconds that the unreinforced polymer burned before it began to drip is given for each additive at a certain usage level. The longer the polymer burned before dripping occurred, the more effective the particular additive in preventing dripping.

TABLE III
NON-DRIPPING ADDITIVES FOR UNREINFORCED POLYPIVALOLACTONE FORMULATIONS[1]

| ADDITIVE | USAGE LEVEL (phr) | BURN TIME[2] (sec.) |
|---|---|---|
| Titanium Dioxide | 8 | 19 |
| Calcium Carbonate | 8 | 42 |
| Calcium Hydroxide | 8 | 62 |
| Ca Mg Aluminosilicate[3] | 5 | 30 |
| Mica[4] | 5 | 14 |
| Asbestos[5] | 5 | 55 |
| Asbestos[6] | 5 | 60 |
| *Asbestos[7] | 12 | 26 |
| Fumed Silica[8] | 2 | 40 |
| *Fumed Silica[9] | 5 | 57 |
| Fiberglass[10] | 5 | 28 |

[1] Unless noted by an asterisk (*), the polypivalolactone formulations used in this table were: Polypivalolactone--see footnote [1] under Table I; Antioxidant--0.1 phr based on weight of the polypivalolactone resin--see footnote [4] under Table I; Nucleating Agent--0.5 phr--see footnote [5] under Table I; Ammonium Polyphosphate--10 phr--see footnote [6] under Table I; Decabromodiphenyl Oxide--4 phr. When marked by an asterisk (*) the formulation contained 18 phr ammonium polyphosphate, no decabromodiphenyl oxide, and the same type and amount of polypivalolactone, antioxidant, and nucleating agent.
[2] The time (in seconds) that the sample burned before dripping occurred. Samples were tested in accordance with the UL-94 Vertical Burn Test described above.
[3] Calcium Magnesium Aluminosilicate; Processed Mineral Fiber, Jim Walter Resources, Inc., maximum particle size 600 microns, average particle size 275 microns.
[4] Suzorite 60S, a phlogopite mica produced by Marietta Resources International, Ltd., maximum particle size 840 microns, average particle size 200 microns.
[5] RG-100, Union Carbide Corporation.
[6] RG-600, Union Carbide Corporation.
[7] Ibid.
[8] Aerosil 200, Pegussa Company.
[9] Ibid.
[10] Owens Corning Fiberglass; Grade 2219-641-3 ¼" Strands).

What is claimed is:

1. A thermoplastic composition which comprises polypivalolactone resin and an inorganic ammonium polyphosphate present in an amount up to about 45 phr sufficient to render the composition flame resistant.

2. The composition of claim 1 including a non-dripping additive selected from the group consisting of fumed silica, asbestos and calcium hydroxide.

3. A composition of claim 1 wherein said composition also includes from 10 phr to 60 phr by weight of a reinforcing filler.

4. The composition of claim 3 wherein the amount of reinforcing filler is from about 30 phr to about 50 phr.

5. The composition of claim 3 in which the reinforcing filler is fiberglass.

6. The composition of claim 3 in which the amount of said polyphosphate is from about 10 phr to about 20 phr.

7. A composition of claim 3 which also contains from about 1 phr to about 20 phr of a polybrominated aromatic compound.

8. The composition of claim 7 wherein the polybrominated aromatic compound is decabromodiphenyl oxide.

9. The composition of claim 7 wherein the polybrominated aromatic compound is bis(dimethoxyphosphinyl)tetrabromo-p-xylene.

10. A thermoplastic composition which comprises polypivalolactone resin having a limiting viscosity number in the range of from about 0.8 to about 2.5, a reinforcing amount of glass fiber reinforcing agent, and an inorganic ammonium polyphosphate present in an amount up to about 30 phr sufficient to render the composition flame resistant.

11. A composition of claim 10 wherein said composition additionally includes from about 1 phr to about 20 phr of a polybrominated aromatic compound.

* * * * *

UNITED STATES PATENT OFFICE
CERTIFICATE OF CORRECTION

PATENT NO. : 4,145,330
DATED : March 20, 1979
INVENTOR(S) : Paul A. Zorzi et al

It is certified that error appears in the above-identified patent and that said Letters Patent are hereby corrected as shown below:

Column 2, lines 11 through 20

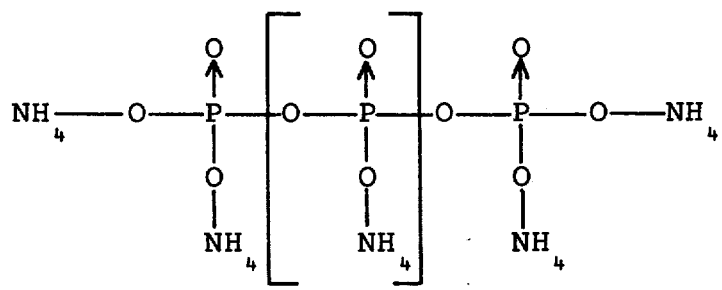

Should read:

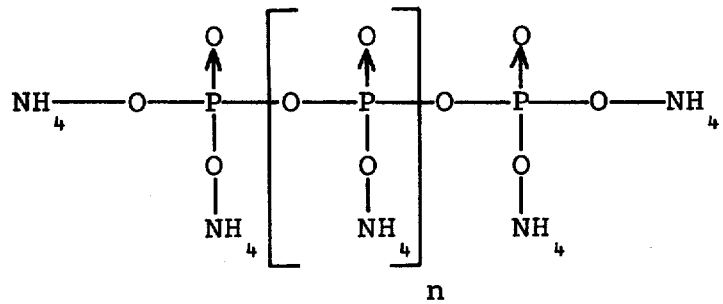

UNITED STATES PATENT AND TRADEMARK OFFICE
CERTIFICATE OF CORRECTION

PATENT NO. : 4,145,330
DATED : March 20, 1979
INVENTOR(S) : Paul A. Zorzi et al

It is certified that error appears in the above—identified patent and that said Letters Patent are hereby corrected as shown below:

Table I in Column 6, the Specific Gravity of Example 3 reads "1.435", should read -- "1.425" --.

Signed and Sealed this

Twentieth Day of November 1979

[SEAL]

Attest:

RUTH C. MASON
Attesting Officer

LUTRELLE F. PARKER
Acting Commissioner of Patents and Trademarks